United States Patent
Chen et al.

(10) Patent No.: US 11,113,244 B1
(45) Date of Patent: Sep. 7, 2021

(54) INTEGRATED DATA PIPELINE

(71) Applicant: A9.com, Inc., Palo Alto, CA (US)

(72) Inventors: Gang Chen, San Jose, CA (US);
Abraham Hossain Bagherjeiran, Sunnyvale, CA (US); Chein-Hsin Liu, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 287 days.

(21) Appl. No.: 15/419,711

(22) Filed: Jan. 30, 2017

(51) Int. Cl.
*G06F 16/174* (2019.01)
*G06F 16/13* (2019.01)
*G06F 16/25* (2019.01)
*G06F 16/2455* (2019.01)

(52) U.S. Cl.
CPC .......... *G06F 16/1748* (2019.01); *G06F 16/13* (2019.01); *G06F 16/1744* (2019.01); *G06F 16/24568* (2019.01); *G06F 16/258* (2019.01)

(58) Field of Classification Search
CPC .......... G06F 16/1748; G06F 16/24568; G06F 16/1744; G06F 16/258; G06F 16/13
USPC ........................................................ 707/692
See application file for complete search history.

(56) References Cited

U.S. PATENT DOCUMENTS

| | | | | |
|---|---|---|---|---|
| 9,038,043 B1* | 5/2015 | Fleetwood | ......... | G06Q 30/0246 717/151 |
| 9,348,602 B1* | 5/2016 | Alapati | ...................... | G06F 3/06 |
| 2011/0307331 A1* | 12/2011 | Richard | .................. | G06Q 30/00 705/14.45 |
| 2012/0016901 A1* | 1/2012 | Agarwal | ............... | G06F 16/258 707/769 |
| 2012/0060165 A1* | 3/2012 | Clarke | .................. | G06F 9/5038 718/104 |
| 2012/0089579 A1* | 4/2012 | Ranade | ................. | G06F 16/183 707/693 |
| 2013/0124466 A1* | 5/2013 | Naidu | ..................... | G06F 8/453 707/610 |
| 2013/0143206 A1* | 6/2013 | McCaffrey | ........... | C12Q 1/6869 435/6.1 |
| 2013/0262287 A1* | 10/2013 | Parsons | .................. | G06Q 40/04 705/37 |
| 2014/0122143 A1* | 5/2014 | Fletcher | ............. | G06Q 10/0631 705/7.14 |
| 2014/0304086 A1* | 10/2014 | Dasdan | .............. | G06Q 30/0275 705/14.71 |

(Continued)

*Primary Examiner* — Hosain T Alam
*Assistant Examiner* — Nicholas E Allen
(74) *Attorney, Agent, or Firm* — Hogan Lovells US LLP

(57) ABSTRACT

An integrated data pipeline can take advantage of a streaming service, which can handle tasks such as automated redelivery, as well as a processing service, which can allocate workers on a task- or event-specific basis. Event data is aggregated and compressed for delivery by the streaming service. The streaming service can deliver the data asynchronously to the processing service, which can disaggregate and decompress the data to obtain the original data records. The type of event for each record can be determined to determine whether the data should be processed using online and/or offline processing. For online processing the appropriate fields are determined and data extracted to be passed to the online processing services. For offline processing the record data is concatenated sequentially into mini-batches, then compacted into larger batch files that are stored for subsequent offline processing.

19 Claims, 9 Drawing Sheets

(56) References Cited

U.S. PATENT DOCUMENTS

| | | | |
|---|---|---|---|
| 2015/0286645 A1* | 10/2015 | Sinha | G06F 16/9535 707/734 |
| 2015/0356314 A1* | 12/2015 | Kumar | G06F 16/2228 713/165 |
| 2015/0372807 A1* | 12/2015 | Khoyi | G06F 16/116 713/150 |
| 2016/0048408 A1* | 2/2016 | Madhu | G06F 11/1458 718/1 |
| 2016/0098037 A1* | 4/2016 | Zornio | G05B 19/41855 700/20 |
| 2016/0260123 A1* | 9/2016 | Mishra | G06Q 30/0244 |
| 2016/0292742 A1* | 10/2016 | Kang | G06F 3/04842 |
| 2016/0306871 A1* | 10/2016 | Chauhan | G06F 16/287 |
| 2016/0328661 A1* | 11/2016 | Reese | G06F 16/29 |
| 2017/0006135 A1* | 1/2017 | Siebel | H04L 67/02 |
| 2017/0024112 A1* | 1/2017 | McKegney | G06F 3/04815 |

* cited by examiner

INTEGRATED DATA PIPELINE

BACKGROUND

Users are increasingly performing tasks using remote computing resources, which may be offered through a shared-resource environment. This has many advantages, as users do not have to purchase and maintain dedicated hardware and software, and instead can pay for only those resources that are utilized at any given time, where those resources typically will be managed by a resource provider. Users can perform tasks such as storing data or executing applications using various types of resources offered by the resource provider. In many situations the sheer volume of data can make it difficult to analyze the data and provide the data for online and/or offline processing, particularly where at least some of the data is needed in near real time.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for an integrated data pipeline that can provide data both in real time for online processing and stored to persistent data storage for offline processing. The pipeline can take advantage of a streaming service, which can handle tasks such as automated redelivery, as well as a processing service, which can allocate workers on a task- or event-specific basis. Event data can be received from one or more data sources to an aggregator server, which is configured to aggregate the data using concurrently executing threads. The aggregated data can then be compressed using, for example, a block compression algorithm. The compressed binary data can be passed to a streaming service, which can include multiple shards operable to concurrently generate data streams corresponding to the data pulled from the event queue. The streams can be transmitted asynchronously to a processing service operable to allocate workers to disaggregate and decompress the data, and in at least some cases re-aggregate the data, in order to obtain individual data records for the events. The raw data records can also be transformed into an appropriate record format, as may be specified by the appropriate library for the pipeline. For each record, a type of event that generated the record can be determined, and based at least in part upon the type of event a type of processing is determined. For online processing, a worker function is allocated to determine the relevant field (s) for the determined event type, and extract the data from the identified fields. Once extracted, the data can be transmitted back to the streaming service and on to one or more online processing services. For offline processing, the record data is stored for a first period of time until a worker is allocated to concatenate the data sequentially into mini-batches of up to a first size. The mini-batches are then stored for a second period of time, until a second worker is allocated to divide the mini-batches up into groups that are then compacted into larger batch files of up to a second size, which is larger than the first size. The larger batch files are then stored to persistent storage for subsequent access by one or more offline processing algorithms. Such an integrated pipeline can be advantageous for various types of tasks, such as online bidding.

Various other functions can be implemented within the various embodiments as well as discussed and suggested elsewhere herein.

Figure 1:
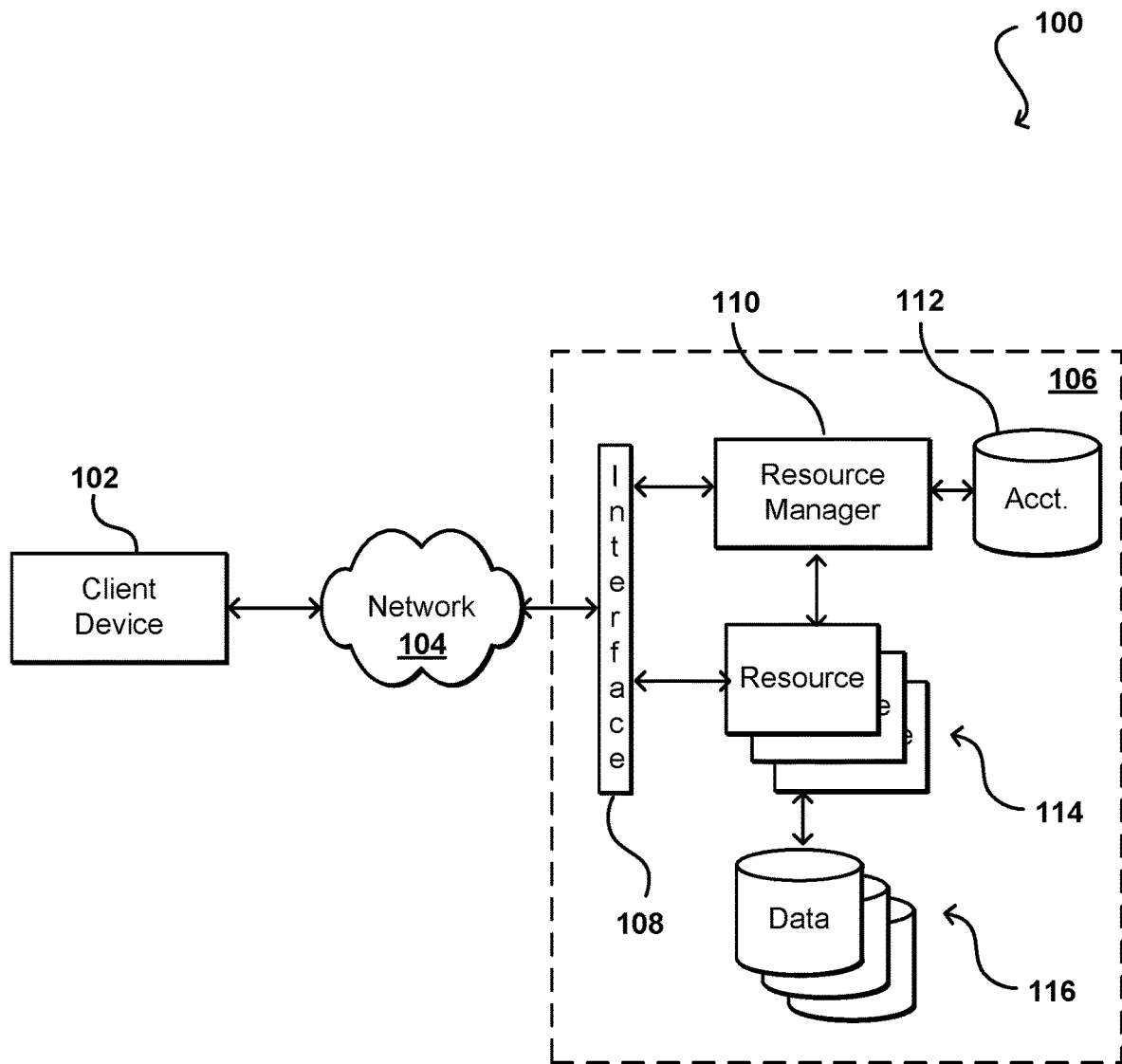
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Such shared resource environments can be used advantageously for a variety of different purposes, and can handle very large data sets with high throughput. For certain applications, such as real-time bidding, there can be a large number of decisions made in very short periods of time in order to enable advertising and other supplemental content to be dynamically selected and displayed with primary content to be provided in response to specific requests. Such applications can utilize machine learning model development and offline data ingestion and analytics in order to provide the most accurate bids possible. Conventional systems can obtain performance data for various instances of supplemental content, such as may be used to determine a click-through-rate for a specific advertisement. These systems do not, however, provide sufficient data logging and processing to provide for dynamic, real-time analysis needed in addition to the providing of data for offline processing.

Accordingly, approaches in accordance with various embodiments can provide an integrated, real-time data pipeline that supports both online and offline data ingestion. These ingestions can be used for applications such as data analysis and machine learning model development. This can be beneficial for a platform such as an online real-time bidding (RTB) advertisement platform, for example, for key RTB tasks such as click-through-rate (CTR) estimation, pacing and frequency management, and bidding algorithm management, among other such options. Offline log data can serve as a primary data source for various data analytical tasks, such as preparing features for training a machine learning algorithm or updating a contribution model. Online data can be used for real-time metric aggregating and updating, which can be used in various critical services, such as for controlling spending or improving customer experience, etc.

In real-time bidding, online advertisements can be bought and sold on a per-impression basis, using programmatic instantaneous auctions. Bidding decisions can be made in very short periods of time, such as on the order of about 100 ms. The bidding amount should be up to date in order to accurately to estimate the value of an impression, where the estimate utilizes information such as the total budget spent, relative ordering of advertising expenditures, CTR, purchase rate, user-ad engagement, or other conversion events of value to an advertiser. Bidding algorithms, a CTR estimation model, and other functionality useful for such purposes can be developed using various types of information, as may include data such as the slot size for an advertisement, a slot position, a time of day, a user segment, and bidding history data, among others. In order to provide for consistent real-time data analysis and machine learning model updating, a service can utilize a data logging pipeline, or other such mechanism, for recording the data for various performance events (i.e., data generated in response to a bid, impression, or click) generated in a real-time manner. The pipeline can also organize the data in a way that is suitable for both offline and online utilization.

Figure 2:
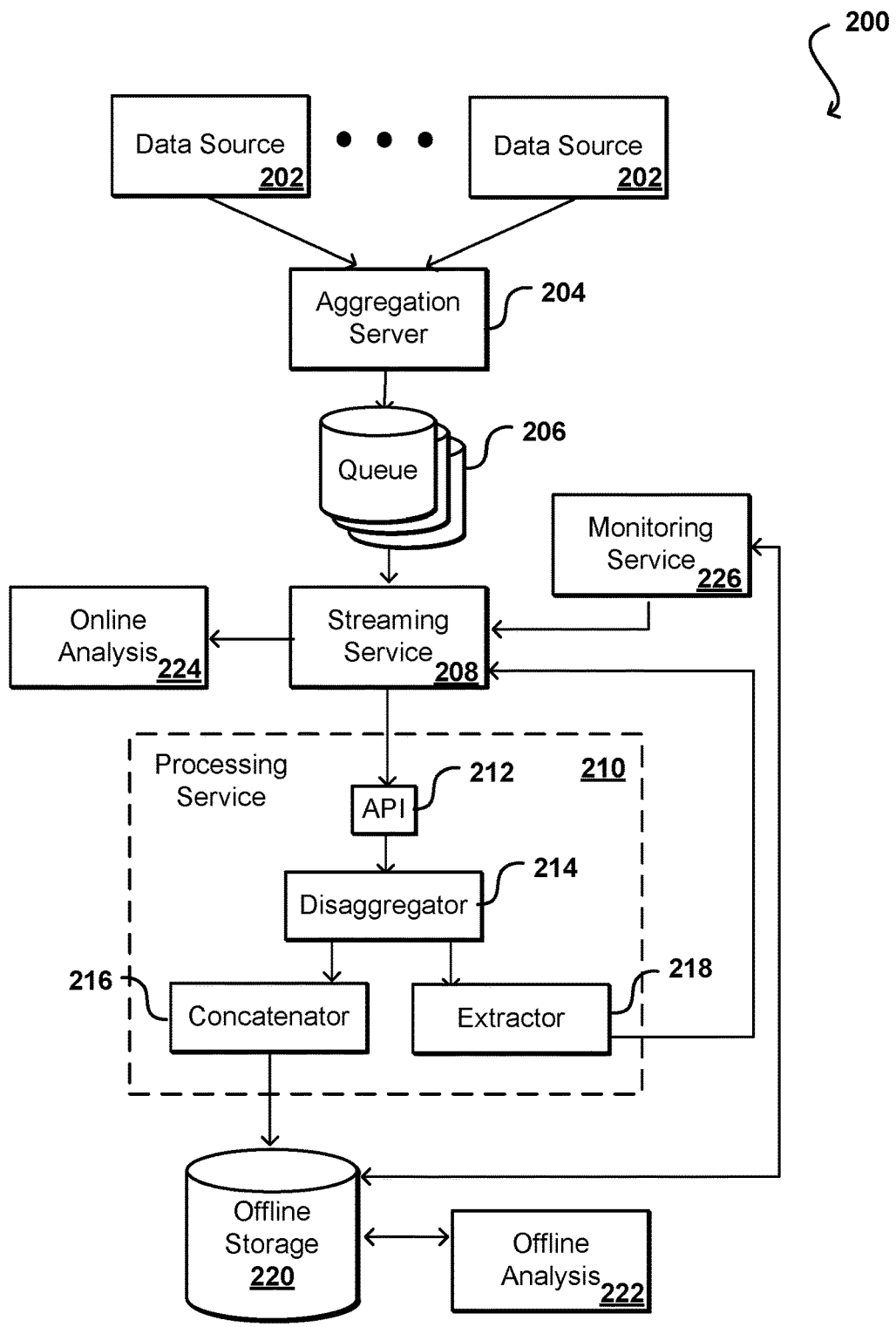
FIG. 2 illustrates an example data pipeline that can be used in accordance with various embodiments.

FIG. 2 illustrates an example architecture 200 that can be used to implement a logging pipeline in accordance with various embodiments. In this example, there can be multiple data sources 202 that can provide data into the pipeline. These can be any appropriate sources, such as end users, application providers, other data services, and the like. The data can be received and/or directed to an aggregation server 204, or other such system or service. The aggregation server can take the form of an asynchronous daemon server running on a web services platform. In some embodiments data will be received to the aggregation server 204 for each relevant event that occurs with respect to one of the data sources 202. For bidding servers, for example, this can include data for a specific bid, impression, or click event. The aggregation server 204 can utilize multiple concurrently executing threads to aggregate up to a determined number of records, or sets of event data, into individual files. In at least some embodiments the data is also compressed into a compressed binary data file, such as to a Bzip2 binary data file (an open-source compression program) or other such option. The maximum number of events for which data is aggregated into a compressed file can be fixed or variable, and in at least some embodiments can be learned over time to obtain maximum throughput. The maximum number can also vary with current workload or resource capacity, among other such options. The compressed binary data can then be written to a thread-safe queue 206 or cache, until such time as the data is able to be processed by a streaming service 208 or other such component of the pipeline. In some embodiments, there can be multiple queues used to hold or cache the data, such as may be used or different types of data, etc.

The streaming service 208 in at least some embodiments is a managed service that is able to pull the compressed data from the queue 206 and stream the data in near-real time from the queue to a target destination, here the processing service 210 among other such options. The streaming service 208 can include multiple components, or "shards," for streaming data, where each shard can write up to a determined amount (e.g., 1 MB) of data per second. The streaming service can scale in at least some embodiments by adjusting the number of shards used to stream the data. The use of data compression to compress every batch of records further reduces the data size. Since compression algorithms such as Bzip2 utilize block-based compression, and the streaming service can charge based on the streaming data volume, the cost can be largely reduced through record aggregation and block compression. Various other block-based streaming compression schemas can be used as well within the scope of the various embodiments. In some embodiments the streaming service can include a producer component (not shown) that is able to listen to the queue 206 and fetch a batch of records to send through the streaming service asynchronously. The producer in this situation functions as an intermediary between the aggregation server and an API or other interface of the streaming service. The producer can also help to determine when to set an automatic and configurable retry mechanism to rewrite records. In this example, a monitoring service 226 can be configured to monitor the data streamed using the service and automatically provide producer performance metrics, among other such monitoring data results.

In this example, the streaming service 208 passes the compressed data files to a processing service 210. In this example, the processing service 210 is a primary consumer of the data streams from the streaming service, at least for the event data discussed herein. There can be various other types of consumers of the data streams as well, as may perform tasks such as redirecting data to persistent and/or offline storage 220 for long term storage, as well as for offline analysis 222 and batched model training, pacing and frequency determinations, and the like. The processing service 210 can utilize various registered functions, discussed in more detail later herein, for consuming data received from the streaming service 208 on one or more of the data streams. In some embodiments, each registered function is capable of pulling data for a specific shard up to a maximum rate, such as five shards per second. Because a number of data records have already been aggregated for each shard, the API 212 receiving the stream can cause the data to first be transmitted to a disaggregator service 214 or component, which can disaggregate the individual records. This can be accomplished in at least some embodiments by transforming a raw record to a specifically defined record format, as may be defined by a corresponding library or other such source.

Once the records have been disaggregated, the task type for each record can be determined. For tasks that are determined to be "online" or dynamic tasks, such as may include real-time performance determinations or model training, data from specific fields of the records can be extracted by an extractor component 218, which in at least some embodiments can include, or work with, a decompressor of the processing service. In some embodiments the disaggregator 214 can also function as a decompressor, among other such options. In some embodiments projection data can be extracted for use in real time bidding or other adjustments. In this example, the extractor component 218 sends the extracted field data back to the streaming service 208, which can send the data on to the appropriate online analysis 224 system or service. While in some embodiments the extractor 218 can send the extracted field data directly to the appropriate online analysis service 224, the use of the streaming service 208 enables the streaming service to manage redelivery and other such aspects that otherwise would need to be handled by the processing service 210 or another such component or system. The use of the streaming service for this two-level cascade streaming provides flexibility for adding additional consumers, or otherwise adjusting consumers, to handle additional or alternative tasks, update machine learning models, and the like. Further, since only data from relevant fields is sent to the second level of the streaming service, the streaming data volume is much smaller than for the first level. This second level of the streaming service used to process extracted fields can also take advantage of various streaming analytics, which can analyze the streaming data in real time using, for example, SQL or Python, etc. In at least some embodiments, result data from the online analysis 224 or offline analysis 222 can be stored to offline storage 220 or another persistent data store.

For tasks that are determined to be "offline" tasks, such as may include complex offline performance analysis or machine learning modeling, the disaggregated and/or decompressed data can be passed to a concatenator 216 system, service, or component. The concatenator, which can correspond to a specific type of registered function for a determined consumer or type of event, can store or accumulate event data for at least a determined period of time, then concatenate the event data sequentially for the lifecycle of the relevant consumer. In at least some embodiments the data is concatenated into a mini-batch, or a smaller batch than was used for the first level streaming, and written to offline storage 220 or another appropriate location. For bidding applications, the event data can include data for bids, impressions, click events, or other such aspects of the process. In at least some embodiments a specific naming pattern is used to write the data to a log repository or other such offline data store, which can be derived from information such as a shard identifier, time and date of the event, and the like. Small log files can pose problems for various offline data analysis solutions, such as an Apache solution utilizing Hadoop and Pig. To address the potential problem, another registered function can regularly (e.g., hourly) compact multiple mini-batches into a single larger batch, such as may take mini-batches of 1 MB each and compact into a file of approximately 64 MB in size. In some embodiment, a monitoring event of the monitoring service 226 can cause a registered function to be allocated in the processing service 210 to read the data for a shard over the previous hour, create a compaction plan by dividing mini-batches into groups until each group reaches approximately the 64 MB file size (or other determined size). It should be noted that the last group total size in a batch may be less than 64 MB. If there are M groups from the previous hour, the hourly registered function can spawn M worker functions to do the actual compaction job by passing them a list of mini-batch bucket key names within each group. In at least some embodiments the original mini-batch data will be deleted after a period of time in order to save offline storage space. The hourly registered function can take less than two minutes in some embodiments to create a divide plan and spawn a number of worker functions in asynchronous calls. The worker functions can run in parallel, and in some embodiments it can take less than sixty seconds to concatenate the 64 MB of data, and an additional 30 seconds or so to upload the data to offline storage.

It is possible that there will be duplicates in streaming consumer data due to retries on either the producer side or the consumer side. When the hourly registered function divides the mini-batches, it can take advantage of the naming pattern and delete any redundant mini-batches based on the fact, that the sequence numbers are unique and of increasing order within each hour and shard combination, such that redundant mini-batches will have the same file name. In a situation where two mini-batches have the same beginning sequence number but a different end sequence number, only the mini-batch with the larger end sequence number will be retained, as it will contain all data from the mini-batch with the smaller end sequence number. Since the events in this example are organized by shards and hour, it can be straightforward for data from corresponding events to be determined. For example, in a bidding system data for a click event can be correlated with its previous bid and impression events within some predefined hour ranges. This information can then be used to formulate the training examples for machine learning model. In the bidding system example the response variable can indicate whether or not there was a click registered, and the independent variables can be extracted from bid and/or impression events. Similarly, such a logging structure can help refine the contribution model as click events can search for associated bid and impression event in predefined hour windows.

The monitoring service 226 in this example can monitor various other metrics for operations, and can work with a failure recovery mechanism to ensure that the logging pipeline is robust. In one embodiment, a number of alarms are set to monitor important metrics. The metrics can include, for example, a number of incoming "put" requests, as a sudden drop in put requests may indicate an issue with a network server, while a significant increase may require additional shards. Another important metric to be monitored can relate to a number of outgoing get requests, which can provide the status of the consumers and ensure the consumers are receiving records at ordinary levels and in usual way. Other metrics can include the latency, which in at least some embodiments should be below a specified level for both put and get requests, as well as the provisioning throughput for read and write operations, which can indicate whether the throughput provision(s) are exceeded and whether additional shards should be allocated. An iterator age metric might also be monitored, which can represent the age of the newest record read from the streaming service, which can indicate how far behind consumers are with respect to the corresponding producer. If the iterator age metric becomes too large, this can indicate that consumers are too busy and there is a large lag between producer and consumer.

The failure recovery mechanism can be realized by various retry and recover attempts. These can include, for example, producer failure retries. A server in at least some embodiments should retry several times before logging errors when having write provision throughput or other recoverable exceptions. Producer failure recovery can also be attempted. A streaming service log can be cached for a period such as 24 hours for data consistency in case of a producer failure. After a server reboot, the cached logs can be resent to the consumers as appropriate. Further, consumer failure recovery can be attempted. Processing service consumers can continue consuming records and writing to offline storage 220. As mentioned, duplicate records should be handled in the next compaction job. In order to manually start the compaction job in at least some embodiments, the current compaction job can be replaced with a temporary job that compacts data for previous hours up to the hour before consumer failure. Various other retry and recovery actions can be performed as well within the scope of the various embodiments.

In a real-time bidding example, offline log data can be important for campaign metric calculations, and can serve as a primary data source for various data analytical tasks such as preparing features for machine learning algorithms and contribution models. Offline batched machine learning can be utilized for regular model parameter updating, such as when the bidding server accumulated enough data to make the model up-to-date. In order to increase the speed of the offline data analysis, a customized logging structure can be utilized for events, such as bid, impression, or click events, which is optimized to reduce the join operations between features and a corresponding response. Online data can be used for real-time metric aggregating and updating as well, which can be used for various important services relating to pacing and frequency management, such as may relate to the controlling of advertising budgeting and spending, as well as improving the user experience. The data received from real-time logging pipeline can be used online for CTR estimation, ads ranking, and selection and bidding model updating, among other such options. Online model parameter updating can quickly link the click events with previous bidding request once a click event appears, enabling a bidder's internal machine learning algorithm to identify new features that quickly lead to new clicks. These can then be used almost immediately for the next bidding decision, particularly during the start period of a new campaign or when there are constantly new unobserved features from a bidding request. Such an online logging feature can be important for the success of bidder in a dynamic and competitive ad exchange environment. Further, the real-time logging pipeline can be flexible enough that any new future change requests from the modeling and learning effects will not require modification of the bidding platform server side code, providing for easy development of new advanced algorithms and experiments.

A real-time bidding platform can operate on top of multiple ad exchanges in at least some embodiments. The bid requests can be sent to multiple bidders that represent the demand side of advertisers. Each bidder can form bids in an ad exchange. A flexible bidding platform as discussed herein can enable various other teams to provide their own bidders. The platform in some embodiments can take the form of a Web service that can work alongside a bidder Web service. The use of a bidding pipeline as discussed herein can enable the appropriate feedback, projections, performance, or other data to be received in near real time. In order to obtain the desired performance, the entire payload received from a bidder can be streamed through the service. Because this can be difficult to sustain in various types of streaming services, the stream can be compressed and send through a processing layer to apportion the data over several different worker functions of the processing service. In some embodiments the workers can perform different tasks, such as to perform budget calculations, real-time modeling updates, data analytics, and the like. Such an approach provides benefits such as are extremely high throughput and a general approach that is not limited to a few fields. The approach is then unblocked for adding or supporting additional use cases. Customers can also be provided with much better feedback on the ads that are provided. Tasks such as indexing and ad adjustment in real time can be performed using the various online processes.

In order to obtain the desired flexibility and scalability that may be desired for such a logging pipeline, various components of the pipeline can be provided using resources of a multi-tenant or shared resource provider environment. Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and simpler guest instance images can be used, as guests do not need a multitude of hardware-specific drivers.

Resource providers can, in at least some embodiments, provide for "partial" or "substantially" full access to a resource, such as a host server, by providing users with native access to the host hardware or specific devices, such as cards plugged into a peripheral control bus or similar data path. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine running an OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some embodiments, virtualization or other such technology can be used to provide a level of separation between guests and host machines from the central system hardware (e.g., CPU, memory, etc.), with native access potentially being available for specific devices on a given host. In other embodiments, native access can be provided to any hardware included in, or available for, a specific host. The electronic environment in such cases might include additional components and/or other arrangements, such as those illustrated in the configuration 200 of FIG. 2, discussed in detail below.

Figure 3:
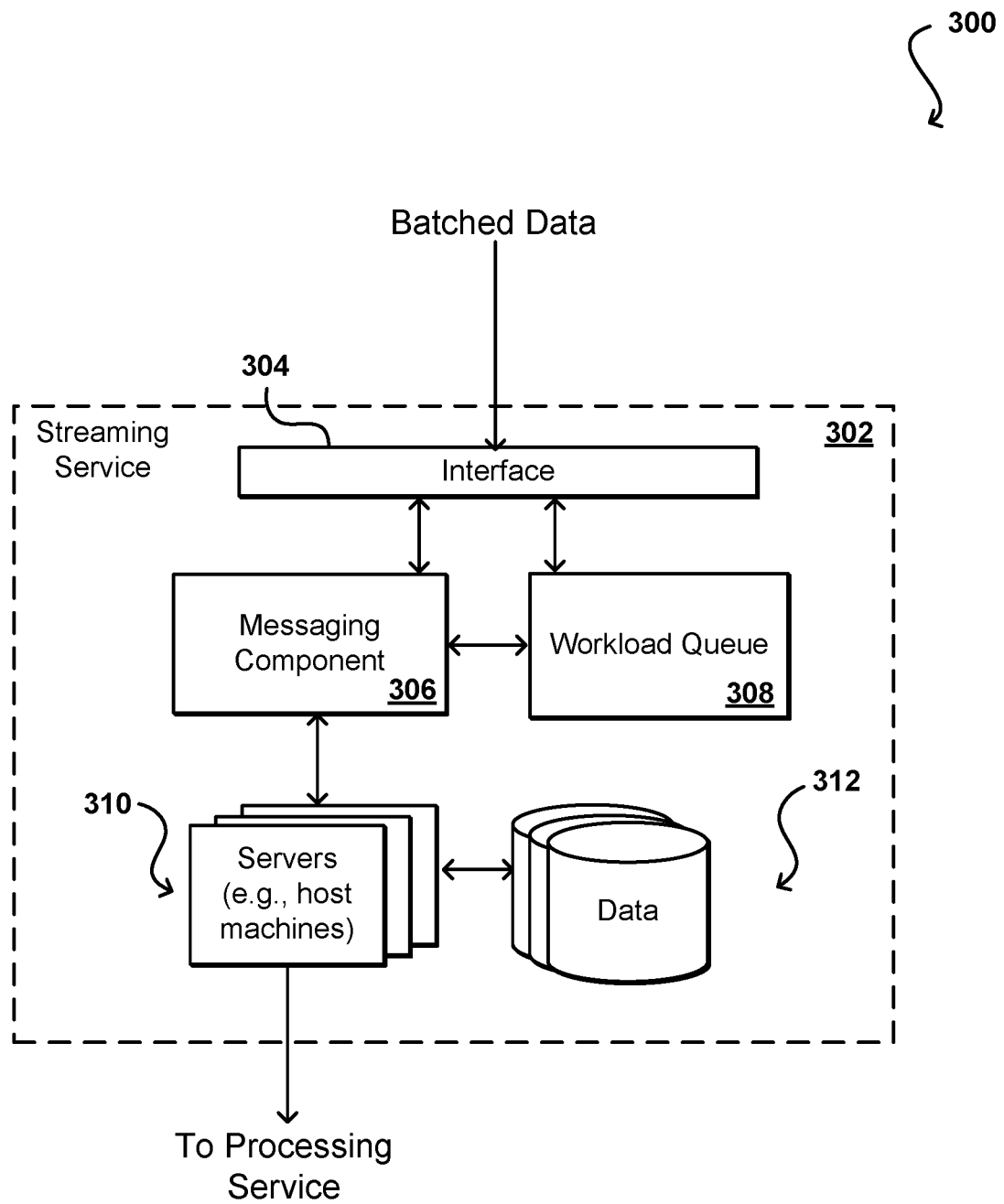
FIG. 3 illustrates an example streaming service that can be utilized in accordance with various embodiments.

For example, FIG. 3 illustrates an example configuration 300 in which data can be processed using a streaming service in accordance with various embodiments. In this example, the data received from various data sources, such as bidders, will be aggregated and transmitted to a streaming service 302. The data can be received by a network interface layer 304 of the streaming service 302. The streaming service can includes a set of servers 310 operable to perform tasks and process jobs for any of a variety of different purposes. A messaging component 306 can be used to facilitate the processing of a received batch of data. For example, the messaging component 306 can utilize one of a number of communication protocols to manage communication between the set of servers 310. Further, the messaging component can partition (if needed) into one or more portions. Further still, the messaging component, or other such component or entity, can send information, such as code, files, and/or data, to the set of servers that includes instructions how the set of severs is to operate when processing a workflow.

In at least some embodiments, information for a data batch can be temporarily stored in at least one workload queue 308. There can be one workload queue for the streaming service 302, one per resource, one per workload, or any other appropriate selection, which may also be outside the streaming service and provided elsewhere in the resource provider environment in some embodiments. The information can be stored in the workload queue until a server (physical or virtual) or other resource with the necessary capacity becomes available. In some embodiments, the workload queue 308 will be part of a queuing service or system that can push out work as capacity becomes available, while in other embodiments the workload queue will act as a quasi-FIFO buffer wherein resources (e.g., workload servers) can pull workload portions from the top of the queue, except where other priority applies as discussed elsewhere herein. In addition to the request, any appropriate information, such as data files or references to outside resources such as database services or code services as discussed elsewhere herein can be provided.

As described, code can be deployed and executed at one or more of the servers in the distributed self-organizing set of servers 310, which when executed, can enable the servers to perform operations to process a workload in a distributed self-organizing manner, without a master server or other management device, to distribute work, handle situations where servers go offline, etc. In this example, a set of servers can register to be part of a distributed self-organizing group of servers. As additional servers join the group, information can be provided to each server that includes at least the identification of the joined server. This can include, for example, each server communicating identification information to other servers, providing identification to a messaging component (e.g., messaging component 306) to distribute to other servers, etc. Servers and other resources can leave and join the self-organizing group of resources as needed.

When a request to process a workload is received, the code at each of the set of servers can enable each server to process the workload. In accordance with various embodiments, workload (e.g., one or more tasks, data, etc.) can be partitioned into one or more portions by one of the servers, some other entity, or a combination thereof. Alternatively, the workload can be received partitioned. In the situation where the request is received already partitioned, the request can include information that identifies the number of portions that make up the workload. In the situation where the workload is partitioned after being received, information indicating the number of partitions can be associated with the workload.

During an "announce" cycle, each server can attempt to claim one or more portions of the workload and provides identifying information that can be used to identify a respective server and the workload portions claimed by each respective server. For example, in an embodiment, as servers become available (e.g., online), the available servers attempt to claim a portion of the workload. When a server claims a portion of the workload, the server generates an entry in a data store (e.g., data store 312) that identifies the server and the portion claimed. The data store 312 can be a secure data store. The entry can be a key value entry, where the key field of the key value pair includes an identifier or other reference identifying the workflow portion and the value field of the key value pair includes an identifier or other reference identifying the server to process the workflow portion. It should be noted that other data stores are contemplated by the embodiments described herein. It should be further noted that a key value entry is an example of a type of entry and other entries are contemplated by the embodiments described herein. The next available server claims an available portion of the workload and generates a respective entry in the data store 312. The process can continue until all portions of the workload are assigned.

In an embodiment, the servers 310 claim a portion of the workload as they become available. In another embodiment, the servers claim a portion of the workload in a particular order, where the order can be a random order or based on predetermined instructions. In accordance with an embodiment, for each portion obtained by a server, the server waits a predetermined amount of time before attempting to obtain an additional portion of the workload. The predetermined amount of time includes, for example, 250 milliseconds. In certain embodiments, a first server (e.g. the first online server) announces its presence. This marks the beginning of an announce cycle, the announce cycle lasting a predetermined amount of time. As additional servers become available, the additional servers announce their presence. A predetermined amount of time after the first server claims the workload, the first server begins assigning portions of the workload to the announced servers. Assigning the workload to the announced servers can include, for example, assigning workload to announced servers with the least amount of work. In the situation where two or more servers are tied for having the least amount of work, the first server can assign work to such servers randomly, in the order they came online, or in some other order. As the first server assigns portions of the workload, additional servers may have become available and announced their presence. At the end of the predetermined amount of time, a second announce cycle begins. Some of the announced servers have been assigned workload while others have not. Additionally, some of the initial servers may be overcapacity. In this situation, servers that are over capacity can assign portions of their workload to servers that are under capacity. This process is repeated until the work is distributed.

At the end of an announce cycle, or in certain embodiments in response to a server obtaining or being assigned a portion of the workload, the servers "broadcasts" (i.e., provide) information to each of the servers in the set of servers. The information can include, for example, an identifier that identifies the server (e.g., the broadcasting server) providing the information and a list of the portions of the workload to be processed by the broadcasting server. In accordance with various embodiments, a server can provide the information to the messaging component which can provide the information to each of the servers, the server can provide the information to each of the servers directly, or a combination thereof. As each server receives the information from the broadcasting server, the receiving servers record the broadcasting server's identifier and the portions of the workload that the broadcasting server is processing or has scheduled to process. The information can be recoded in a data store 312, in onboard memory associated with each receiving server, or another data storage device.

In accordance with an embodiment, the announce cycle ends when all portions of the workload are claimed. In various embodiments, the announce cycle ends when all portions of the workload are claimed and a minimum amount of time has elapsed since the start of the announce cycle. An example minimum time can be 10 seconds. At the end of each announce cycle, each participating server will have received one or more listings from each server that identifies the portions of workload each participating server is assigned to. Using the received listings, each server can determine an amount of workload for each of the other servers. In accordance with various embodiments, the amount of workload can be the number of workload portions assigned to a server. To determine whether to balance the workload across the servers, the amount of workload associated with each server can be compared to a threshold operating capacity. Servers above the threshold operating capacity can reassign workload portions to servers below the threshold operating capacity. The threshold operating capacity can be, for example, the total number of workload portions divided by the total number of servers, for example, rounded up. It should be noted that other approaches can be used to determine the threshold operating capacity as is known to those skilled in the art, for example, each participating server could have a different processing capacity so the load would not be distributed evenly.

In the situation where a server (e.g., an over-capacity server), has more workload portions than the threshold operating capacity, the over-capacity sever can assign to a server (e.g., an under-capacity server) that has less than the threshold operating capacity at least some of their extra workload portions. For example, the over-capacity server can identify servers that have less than the threshold operating capacity. If the under-capacity server would still have less than the threshold operating capacity after receiving an additional portion of the workload, the over-capacity server can assign a portion of workload to the under-capacity server. The process can continue until each over-capacity server is no longer over capacity or until there are no under-capacity servers. In the situation where there are multiple under-capacity servers, the server that is the most under capacity is first assigned a workload portion.

In the situation where an over-capacity server assigns a workload portion to a server, the over-capacity server removes the entry from the data store indicating that the assigned workload portion was to be processed by the over-capacity server and provides reassign information to the server receiving the workload portion. Once the receiving server receives the workload portion, the receiving server generates an entry in the data store that associates the workload portion and the receiving server. The receiving server then provides (e.g., broadcasts) information (e.g., an identifier that identifies the server and a list of the portions of the workload to be processed by the server) to each of the distributed self-organizing group of servers.

In certain embodiments, one or more workload portions may not be accounted for. As described, the workload is partitioned or otherwise segmented into one or more portions that can be claimed by the set of servers in the distributed self-organizing group of servers. Each server includes information that indicates the total number of workload portions and information about the number of workload portions assigned to each server. Based on the total number of workload portions and the number of portions assigned to each server, a determination can be made whether all workload portions are assigned. The determination can be made by one or more of the servers. For example, in accordance with an embodiment, a server that determines that it is at capacity can then determine whether all workload portions are accounted for. It should be noted that other approaches can be used to determine the server that makes the determination. For each unaccounted for workload portion, the key indicating that the workload portion to be processed by another server is removed from the data store. Next, a server determines an available server to receive the unaccounted for workload portion. In this example, the server that removed the entry can determine an available server. An available server is a server determined to be under capacity. Once the available server receives the unaccounted for workload portion, the available server generates an entry in the data store that includes a reference to the received workload portion and its identity. Thereafter, the server broadcasts information (e.g., an identifier that identifies the server and a list of the portions of the workload to be processed by the server) to each of the servers in the set of servers. The process repeats until all portions of the workload are accounted for or until another such event is detected. For example, the process can repeat after a predetermined amount of time of assigning an unaccounted for workload portion to a server has passed. When no more workload portions need to be assigned, the process can end.

In some embodiments, a situation may arise where a server receives a reassign request but the server determines that it was already assigned the workload portion being reassigned to it. This can occur if another server (e.g., the server sending the reassign request) determines that the server (e.g., the server receiving the reassign request) has gone stale because it failed to respond in the announce cycle. In this situation, the data store is analyzed (e.g., by the requesting server or the receiving server) to determine whether the reassigned workload portion includes an entry assigning the reassigned workload portion to another server. In the situation that the workload portion includes such an entry, the server that received the reassign information stops all work on the reassigned workload portion. In the situation where no other server is processing the reassigned workload portion, a new entry is generated in the data store indicating that the reassigned server is processing the workload portion. In the situation where the server that received the reassign request does not determine that it is assigned the workload portion being reassigned to it, a new entry is generated in the data store indicating that the reassigned server is processing the workload portion.

In accordance with various embodiments, an advantage of such an approach is that a significant portion of the work can be offloaded to one or more remote services or virtual instances distributed in a self-organizing manner. The approach can be thought of as outsourcing threads to remote machines that are able to process a particular task and then return or transmit the result. For any portion of a workload that can be offloaded to another device for execution, a user can select to execute this workload for some or all of the tasks to a workload service, offered by a resource provider, in order to ensure that the user's machines are not overloaded, as well as to reduce the capacity of resources that the user must provide and support locally.

In various embodiments, the processing of the workload portions can occur over a highly connected network, which can utilize devices such as high-throughput commodity switches (i.e., switches or routers with relatively small buffers compared to the amount of throughput). The network and the host devices can be provided and/or utilized in any appropriate electronic environment, such as a data center offering shared resources or other multi-tenant environments, as well as any non-virtualized or otherwise private data center. Although various embodiments described herein are discussed in regard to a particular network topology (such as the one described in FIG. 1), it should be understood that embodiments described herein for managing workload or other information can apply to any network topology. That is, in accordance with embodiments described herein, a management system or any control system can be used to automatically process workload in any network topology. In still further embodiments, such approaches can be provided as a service that can be used to remotely process information in a customer's network environment, while in still other embodiments, such approaches can be provided to, and included as part of a customer's network environment, e.g., as a management system component or other such control component, that can be used to process information in accordance with embodiments described herein.

Figure 4:
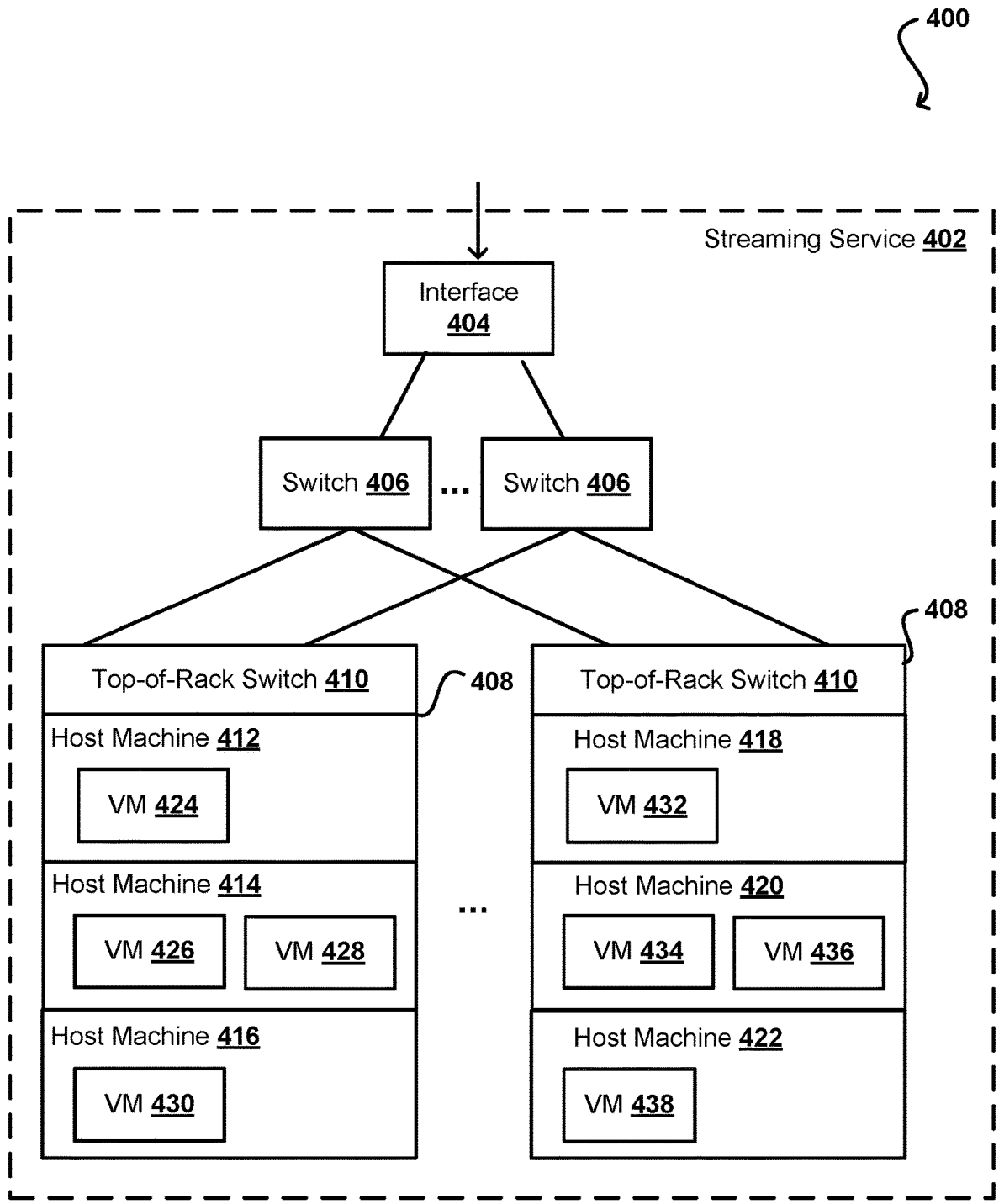
FIG. 4 illustrates an example streaming service that can be utilized in accordance with various embodiments.

The electronic environment in such cases might include additional components and/or other arrangements, such as those illustrated in the configuration 400 of FIG. 4. FIG. 4 illustrates a resource center environment of a service provider that provides computing resources in accordance with various embodiments. In the illustrated embodiment, a service provider (e.g., a cloud computing resource provider) can maintain a set of resources providing a streaming service 402. The physical resources can be used to host a number of virtual machine instances or virtual servers that can be allocated as appropriate. The resources may include one or more racks 408 of host machines 412, 414, 416, 418, 420, 422 wherein each host machine on a particular rack is connected to a single top-of-rack (TOR) switch 410. These TOR switches can be further connected to one or more other switches 406 which enable the host servers to connect to the appropriate network, service, system, or application. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host server can host one or more virtual machine instances 424, 426, 428, 430, 432, 424, 436, 438 that have been provisioned to execute the various tasks or services. Each virtual machine can be provisioned with its own operating system (OS) including a kernel, drivers, process management and the like. When a virtual machine instance is to be allocated, the service provider can carry out the processes to provision the virtual machine instance which will be hosted on the physical resources (e.g., host machines) of the service provider. The virtual machine instance can then be used to execute the various applications and services utilizing the resources of the service provider. An advantage of such an approach is that a significant portion of the work can be offloaded from to one or more remote services or virtual instances distributed in a self-organizing manner. The approach can be thought of as outsourcing threads to remote machines that are able to process a particular task and then return the result. For any portion of a workload that can be offloaded to another device for execution, a user can select to execute this workload for some or all of the tasks to a workload service, offered by a resource provider, in order to ensure that the user's machines are not overloaded, as well as to reduce the capacity of resources that the user must provide and support locally.

To provide the biding pipeline with the flexibility and scalability desired for many applications, resource instances such as virtual machines can also be allocated for a period of time in order to process related tasks. Approaches in accordance with various embodiments can allocate resource instances on a task or event basis to execute a function. A resource instance can be allocated to run a function in response to an event, or batch of events, and once the function has completed that instance can either be made available for processing a different event or destroyed, among other such options.

Figure 5:
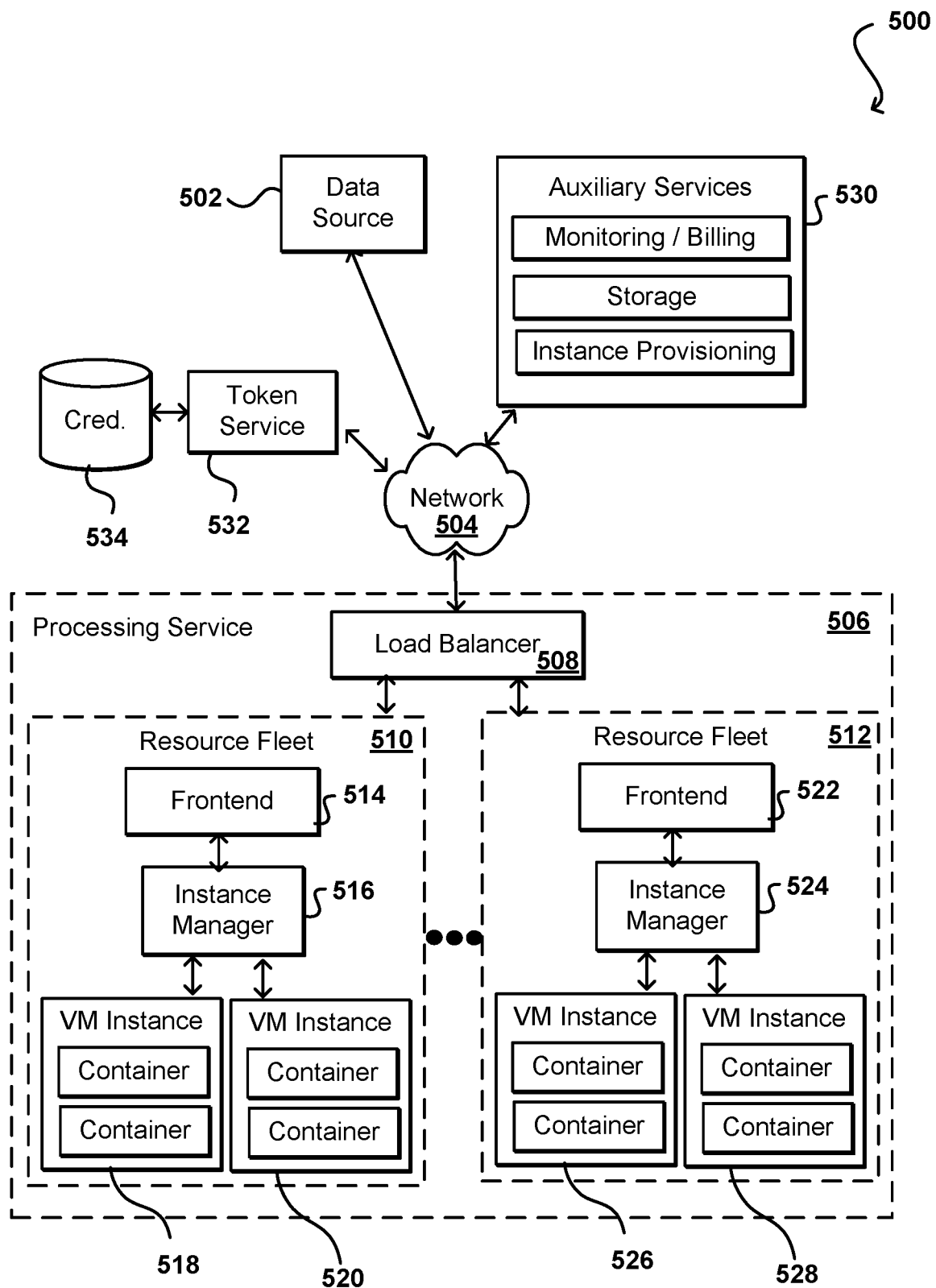
FIG. 5 illustrates an example processing service that can be utilized in accordance with various embodiments.

FIG. 5 illustrates components of an example environment 500 that can be used to implement such functionality. The functionality can be offered as a service, such as a Web service, in at least some embodiments, wherein a data source 502, such as a streaming service, can submit event data over at least one network 504 to processing service 506, which can also be provided using resources of a resource provider environment, service provider environment, or other shared resource or multi-tenant environment. The event data, which can be compressed and batched as discussed herein, can be associated with specific code to be executed in the resource environment based on, for example, a type of event. This code can be registered with the system, and will be referred to herein as a registered function, which can be owned by a respective customer or available for use by multiple customers, among other such options. The compute service offered by the resource environment can be referred to as a "serverless" compute service that can allocate virtual resources to execute registered functions in response to customer events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging.

In some embodiments, a registered function can include specific code for a task, as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A customer providing the code for a function can specify various configuration parameters, such as the memory, timeout period, and access rules, among other such aspects. The customer in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the customer. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays. Routing information for customer requests or events to execute on a virtual compute fleet (e.g., a group of virtual machine instances that may be used to service such requests) based on the frequency of execution of the user code enables high frequency user code to achieve high distribution, which can be good for fault tolerance, and enables low frequency user code to achieve high consolidation, which can be good for cost reduction.

An environment such as that described with respect to FIG. 5 can facilitate the handling of requests to execute user code on a virtual compute fleet by utilizing the containers created on the virtual machine instances as compute capacity. Information for a request or event can be received to a load balancer 208 that can determine an appropriate resource fleet 510, 512 to which to direct the information. As will be discussed in more detail later herein, the decision can be based upon various types of information, as may include the context associated with the type of event or request. Upon receiving a request to execute user code on a selected virtual compute fleet 510, 512, a frontend service 514, 522 associated with the virtual compute fleet can provide the information to an instance manager, which can direct the information to a virtual machine (VM) instance 518, 520, 526, 528 where a container on the instance can provide an execution environment for the registered function.

The data source 502 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 5, the processing service 506 is illustrated as being connected to at least one network 504. In some embodiments, any of the components within the recourse environment can communicate with other components (e.g., client computing devices and auxiliary services 530, which may include monitoring/logging/billing services, storage service, an instance provisioning service, and/or other services that may communicate with components or components of the processing service 506. In other embodiments, only certain components such as the load balancer 508 and/or the frontends 514, 522 may be connected to the network 504, and other components of the virtual resource service (i.e., components of the resource fleets) may communicate with other components of the streaming service 506 via the load balancer 508 and/or the frontends 514, 522.

Customer may use the resource fleets 510, 512 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 5, a first resource fleet 510 includes a frontend 514, an instance manager 516 (later referred to herein as a worker manager), and virtual machine instances 518, 520. Similarly, other resource fleets 512 can also include a frontend 522, an instance manager 524, and virtual machine instances 526, 528, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 508 serves as a front door to all the other services provided by the virtual compute system. The load balancer 508 processes requests to execute user code on the virtual compute system and handles the first level of load balancing across the frontends 514, 522. For example, the load balancer 508 may distribute the requests among the frontends 514, 522 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the processing service 506) prior to the request is received by the load balancer 508. The virtual compute system may vary its code execution strategy based on where the code is available at the time the request is processed.

In some embodiments, the frontend 514 for a fleet can determine that the requests are properly authorized. For example, the frontend 514 may determine whether the user associated with the request is authorized to access the customer code specified in the request. The frontend 514 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 514. The frontend 514 may also receive the request to execute such customer code when an event is detected, such as an event that the customer has registered to trigger automatic request generation. For example, the customer may have registered the customer code with an auxiliary service 530 and specified that whenever a particular event occurs (e.g., a new file is uploaded), the request to execute the customer code is sent to the frontend 514. Alternatively, the customer may have registered a timed job (e.g., execute the user code every 24 hours). In such an example, when the scheduled time arrives for the timed job, the request to execute the customer code may be sent to the frontend 514. In yet another example, the frontend 514 may have a queue of incoming code execution requests, and when the batch job for a customer is removed from the virtual compute system's work queue, the frontend 514 may process the customer request. In yet another example, the request may originate from another component within the streaming service 506 or other servers or services not illustrated in FIG. 2.

A one or more third-party libraries (including native libraries) can be specified to be used along with the task-specific code. In one embodiment, a customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 514 can receive requests to execute customer code on the virtual compute system that have been processed by the load balancer 508. The frontend 514 can request the instance manager 516 associated with the frontend 514 of the particular fleet 510 to find compute capacity in one of the virtual machine instances 518, 520 managed by the instance manager 516. The frontend 514 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 516 manages the virtual machine instances in the respective fleet. After a request has been successfully processed by the load balancer 508 and the frontend 514, the instance manager 516 finds capacity to service the request to execute customer code on the virtual compute system. For example, if there exists a container on a particular virtual machine instance that has the user code loaded thereon, the instance manager 516 may assign the container to the request and cause the request to be executed in the container. Alternatively, if the customer code is available in the local cache of one of the virtual machine instances, the instance manager 516 may create a new container on such an instance, assign the container to the request, and cause the customer code to be loaded and executed in the container. Otherwise, the instance manager 516 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 508 or frontend 514). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 530. The data may comprise user code uploaded by one or more customers, metadata associated with such customer code, or any other data utilized by the virtual compute system to perform one or more techniques described herein. Although only the storage service is illustrated in the example of FIG. 5, the streaming service 506 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 516 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 140).

The instance manager 516 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 516 may tear down the container used to execute the user code to free up the resources it occupied to be used for other containers in the instance. Alternatively, the instance manager 516 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 516 may tear down the instance in which the container used to execute the customer code was created. Alternatively, the instance manager 516 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 530 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 516 may perform health checks on the instances and containers managed by the instance manager (e.g., an "active pool" of virtual machine instances managed by the instance manager and currently assigned to one or more customers). For example, the health checks performed by the instance manager 516 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 516 performs the health checks periodically. In some embodiments, the frequency of the health checks may be adjusted automatically based on the result of the health checks. In other embodiments, the frequency of the health checks may be adjusted based on customer requests. In some embodiments, the instance manager 516 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 514, 522 can route code-processing requests according to a method that is different than the method used by the load balancer 508 to route requests among the frontends. For example, a frontend 514 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 500 of FIG. 5, the token can be provided by a token service 532, which can be internal or external to the resource environment 506, and may managed by the resource provider or a third party in various embodiments. The token service can store information about various types of roles and access in a credential repository 534, or other appropriate location, and in response to a request for an access token for a registered function, can determine the appropriate role and permissions and provide a corresponding access token to be provided to the allocated resource instance. The frontend 514 or instance manager 516 for a relevant resource fleet 510 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Using such an identity management model, the function instances triggered by any event could thus have access to credentials with the same privileges. For example, a registered function can have input access to a specified data bucket specified in the triggering event and write access to a corresponding database table. The assigned identity role for this function could then allow any function instance to read from any available bucket from that data source and write into any available table in the relevant database. A vulnerability present in the registered lambda function (i.e., an extensible markup language (XML) external entity resolution) could allow a producer of an event to hijack the credentials for the registered function, such as by using an XML external entity attack and retrieving the credentials from a local metadata endpoint for the data source. The security breach might then spread across the buckets of all function owners as well as all available tables in the database.

Accordingly, approaches in accordance with various embodiments attempt to enhance security and limit the impact of any vulnerabilities by creating and delivering temporary credentials for each event, or type of event, that can act as a trigger for a registered function. While the registered function might be associated with a role having a broader set of permissions, the temporary credentials derived therefrom can have privileges restricted to those required to process the triggering event. A function owner can define one or more parameterized access policies for his or her registered function(s) that can be based at least in part upon the types of triggering events for that registered function. The resource allocation service can use these parameterized access policies to generate policy instances corresponding to each event, and use the policy instances for creating and delivering the temporary credentials with each event.

Figure 6:
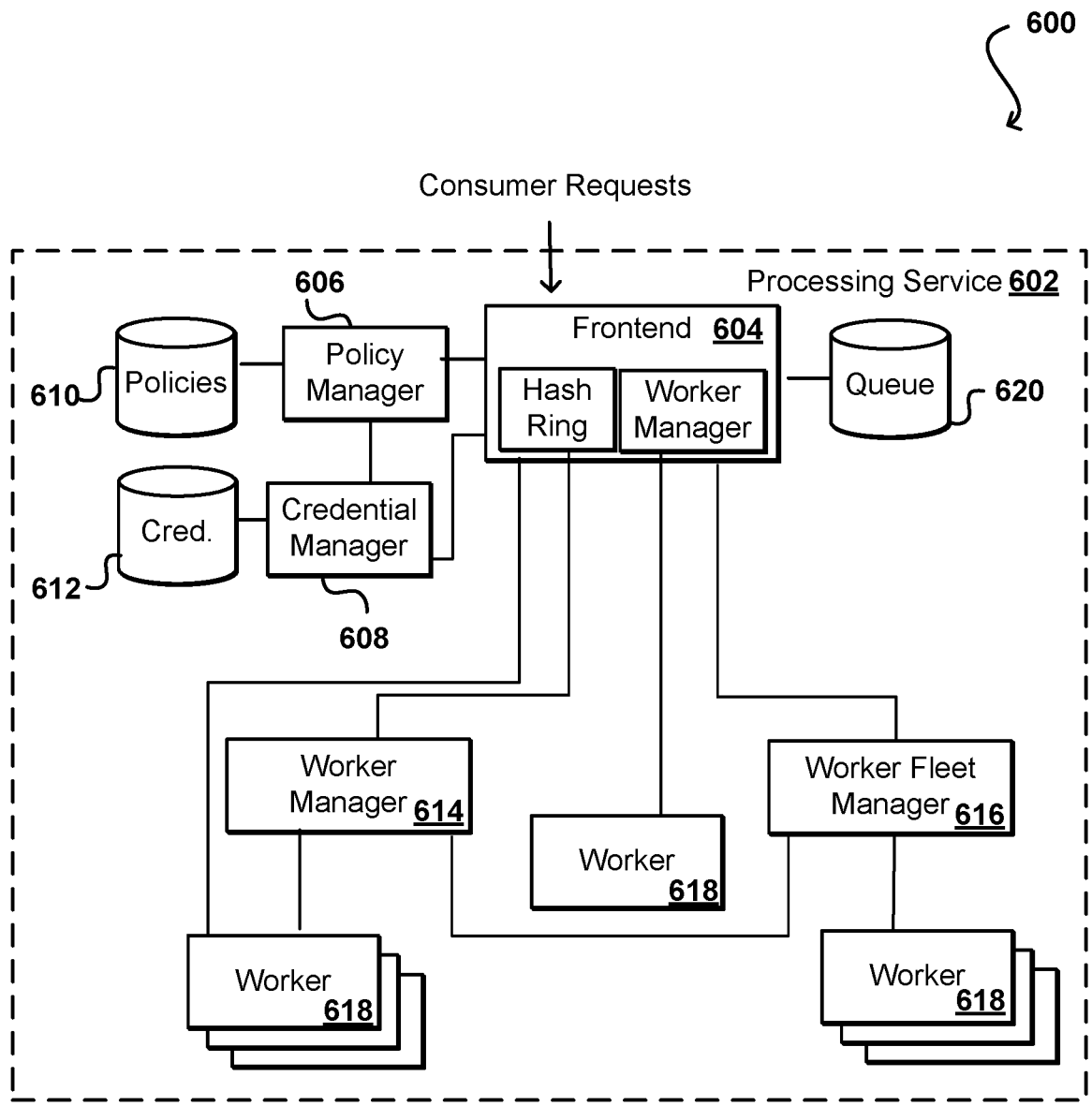
FIG. 6 illustrates an example processing service that can be utilized in accordance with various embodiments.

FIG. 6 illustrates an example environment 600 that can be used to implement at least some of this functionality. In this example, information for customer requests or events can be directed to a processing service 602, which in some embodiments can be implemented using a resource fleet. The information can be directed using a load balancer and/or interface layer as discussed previously as part of a resource allocation environment. In this example the resource instances will be referred to as "workers," which in various embodiments can refer to the virtual machine instances described with respect to FIG. 5. It should be understood, however, that various other types of resource instances can be utilized as workers as well within the scope of the various embodiments.

As described, the frontend 604 may receive an event notification, customer request, or other event information that indicates an event has occurred for which a registered function should be utilized or processing. In this example, the frontend 604 can determine the appropriate registered function and place the event information in an event queue 620. In other embodiments the event information might be placed into the event queue before determining the registered function, or the event information might specify the registered function, among other such options. Further, in this event the frontend 604 and/or a worker manager of the frontend can place the event information in the event queue 620, while in other embodiments other worker managers 614, 616 might receive the information and place the information in the same, or a different queue, among other such options. The frontend, worker manager, or a separate queue manager can determine that a worker 618 is now available to process the event information using the respective registered function. This can include, for example, determining that a new instance should be initialized to process the event as well as allocating an existing instance, etc. The respective worker manager 614 can then allocate the relevant worker 618 for the event, pull the event information from the event queue 620, and provide the information to the allocated worker 618 for processing using the registered function.

At some subsequent point, the allocated worker 614 will complete processing for the event. This can occur for a number of different reasons as discussed elsewhere herein. The allocated instance can return a result of the processing that can be received back to the worker manager 614 and/or the frontend 604. In some embodiments the result will go to the worker manager, so the manager knows the instance is available for processing another event, and then can go to the frontend, so the frontend can provide any appropriate response or take another appropriate action.

In order to process the event, a worker 618 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Accordingly, approaches in accordance with various embodiments can provide event-specific credentials that are derived from an identity role bound, or otherwise associated, to the registered function for a resource instance. The necessary privileges can be provided under the role, but the restricted credentials can prevent access outside that needed to process the event. A system, component, or service such as a credential manager 608 can create a temporary token that has access only to those input and output sources required for processing the event, and can cause that token to be passed to the relevant worker 618 allocated for the event. The event-specific credential can be bound to the resource instance allocated in response to a specific event, and the permissions granted under the temporary credential determined based upon the specific event. The credential manager 608 can generate a temporary token that is event-specific, and can cause that temporary token to also be stored to a credential repository 612 or other appropriate cache such that the credentials can be passed to any other resource instance allocated for a registered function in response to the same type of event.

The event-specific credential can be generated according to the security token bound to the registered function and received from the token service in at least some embodiments. In order to determine which subset of permissions to be granted from the token, a function owner can define one or more relevant access policies that can be stored to a relevant policy data store 610 or other accessible location. A policy manager 606, or other such system or service, can work with the credential manager 608 to determine the appropriate policy for an event, such as from a policy repository 610, which the credential manager 608 can then use to determine the appropriate permissions and generate the temporary credential to be provided to the allocated worker 618. The policy manager in some embodiments can maintain a mapping between the policies and events, in order to derive the appropriate temporary credentials from the function role. It should be understood that in at least some embodiments the policy manager 606 and/or credential manager 608 could be implemented in the frontend 604, an event router, or another such component discussed or suggested herein.

In at least some embodiments a function owner can provide a template policy which includes variables whose values will be specific to an event. This can include, for example, identifiers for the input and output data sources to which access can be granted, as well as the type of access and other such information. For each event, the available access for the relevant role can be determined, and the variable values for the event inserted into the template policy. The policy manager can then ensure that the permissions per the policy are contained within the overall permissions of the role, and if so can generate the temporary credential to be provided to the allocated worker. In some embodiments the credential manager can generate the event-specific credentials, while in other embodiments the credential manager can submit a request to the token service to receive an event-specific token, among other such options. As mentioned, the credential manager 608 can cache a received event-specific token in a local credential cache 612 to be used for other similar events for the registered function over the lifetime of the temporary credential.

In some embodiments the frontend 604 or worker manager 614 will perform a lookup to determine the relevant role for a function before performing the worker allocation. The frontend or worker manager can also, directly or via a policy manager 606, determine the appropriate template policy mapped to the specific event. The frontend or worker manager can then, directly or via the credential manager, begin filling in the template using the event-specific values. As an example, a registered function might be triggered by a notification event on a storage service, and the event can be received from any bucket on that storage service. The respective values can be filled into the policy template with the specific buckets, tables, or other sources specified in the policy. The policy can then be instantiated into a specific string, such that the policy does not have any value to other parties. The variables in the template policy are thus filled with the respective values from the triggering event. The event-specific policy can then be processed with the base credential received for the role to obtain a second token that has restricted privileges, from the base credentials, specific to the triggering event. The event and the temporary event-specific token can then be passed along to the allocated worker. If any of the credentials are leaked or otherwise obtained by an unintended third party, the credentials would only provide access to the specific input and output sources for the event. The event-specific credentials can also have a shorter period of time in some embodiments, such as on the order of a couple of minutes at most, which can be much shorter than the lifetime of the base credentials for the role. This can include, for example, periods that start right away but end before the valid lifetime of the base credential ends, or can include a specified period of time in the future corresponding to a predicted execution time of the registered function for the event, among other such options.

Figure 7:
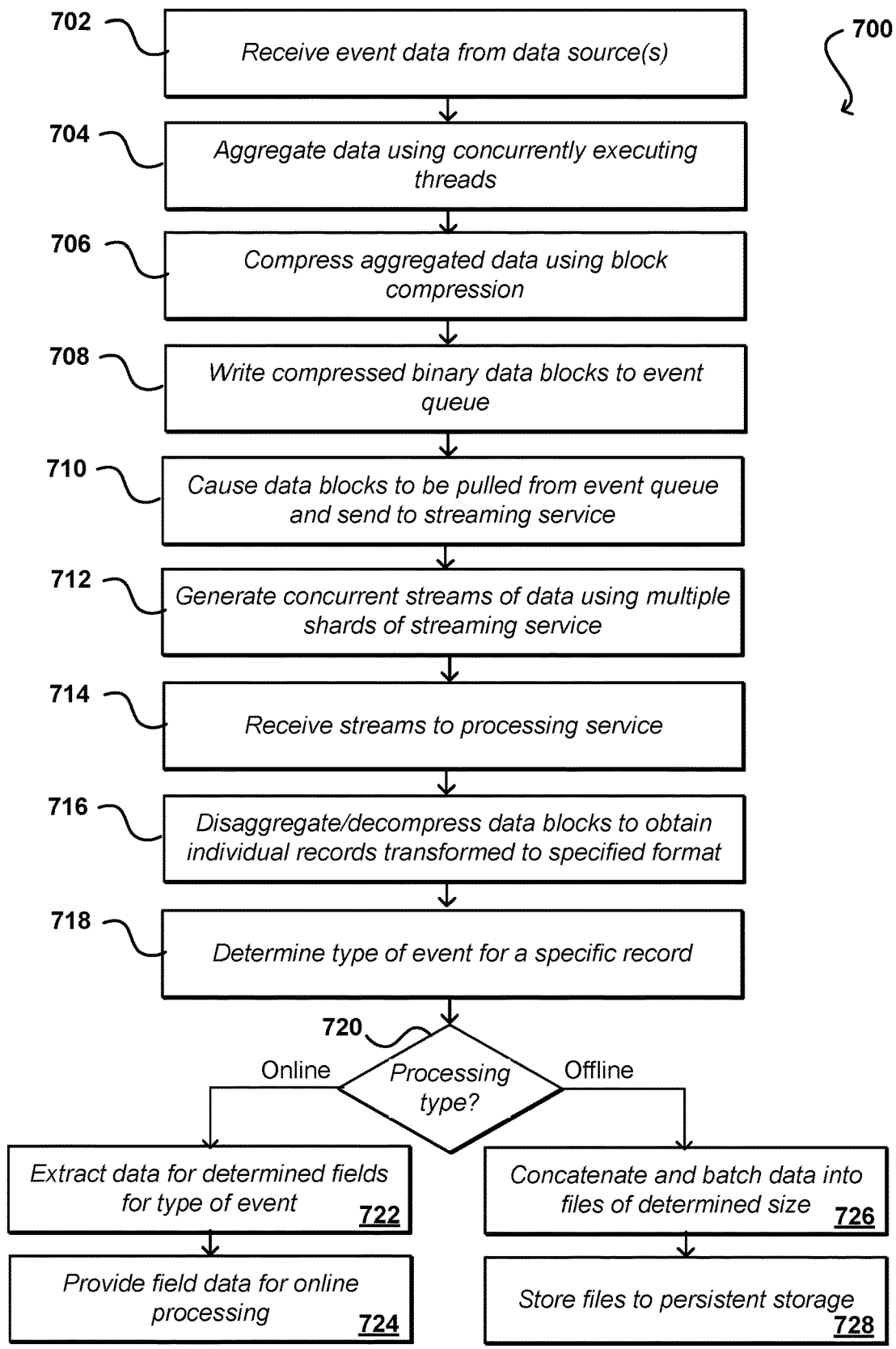
FIG. 7 illustrates an example process for managing data using an integrated data pipeline that can be utilized in accordance with various embodiments.

FIG. 7 illustrates an example process 700 for utilizing an integrated data pipeline that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, event data is received 702 from one or more data sources. These can be any appropriate data sources, such as other clients, systems, or services, and in a bidding context can include bidders or performance monitors, among other such options. In at least some embodiments, event data is received in a separate request for each occurrence of a relevant event. In at least some embodiments the data is received to an aggregator server, which is configured to aggregate 704 the data into individual blocks, chunks, objects, or other groupings using concurrently executing threads. The data can be aggregated into blocks of up to a determined or maximum size, which can be fixed or variable based upon administrator determination, current workload, or other such factors. In addition to aggregation, the aggregated data can be compressed 706 using, for example, a block compression algorithm such as Bzip2. The compressed binary data blocks can then be written 708 to an event queue or other such cache, in resident memory or otherwise, for subsequent access.

In this example process, the compressed data can be caused 710 to be pulled from the event queue for processing by a streaming service. The streaming service can include multiple shards that are operable to concurrently generate 712 streams of data corresponding to the data files pulled from the event queue. An advantage of using such a streaming service is that the streaming service can handle retries and other delivery issues automatically. The streams can be received 714 asynchronously to a processing service that is operable to allocate workers to process registered functions for processing the data on an event- or task-specific basis. The data files can be disaggregated and decompressed 716 in order to obtain the individual data records for the events. In at least some embodiments the raw data records will also be transformed into an appropriate record format, as may be specified by the appropriate library for the pipeline. For each record, a type of event that generated the record can be determined 718. Based at least in part upon the type of event, at least one type of processing to be performed can be determined 720. In this example, the types of processing will be grouped into online or offline processing, although various other types or sub-types can be utilized as well within the scope of the various embodiments. For online processing, the data for the determined fields can be extracted 722 based at least in part upon the type of event, and that data provided 724 for online processing. As discussed elsewhere herein, the streaming service can be used again to manage delivery of the field data to the online processing service(s). For offline processing, the data can be concatenated and batched 726 into files of up to a determined size, and can be stored 728 to persistent storage. Various offline processes can then access the stored data as needed and at the appropriate times. As should be understood, for certain types of events both offline and online processing can be performed as well.

Figure 8A:
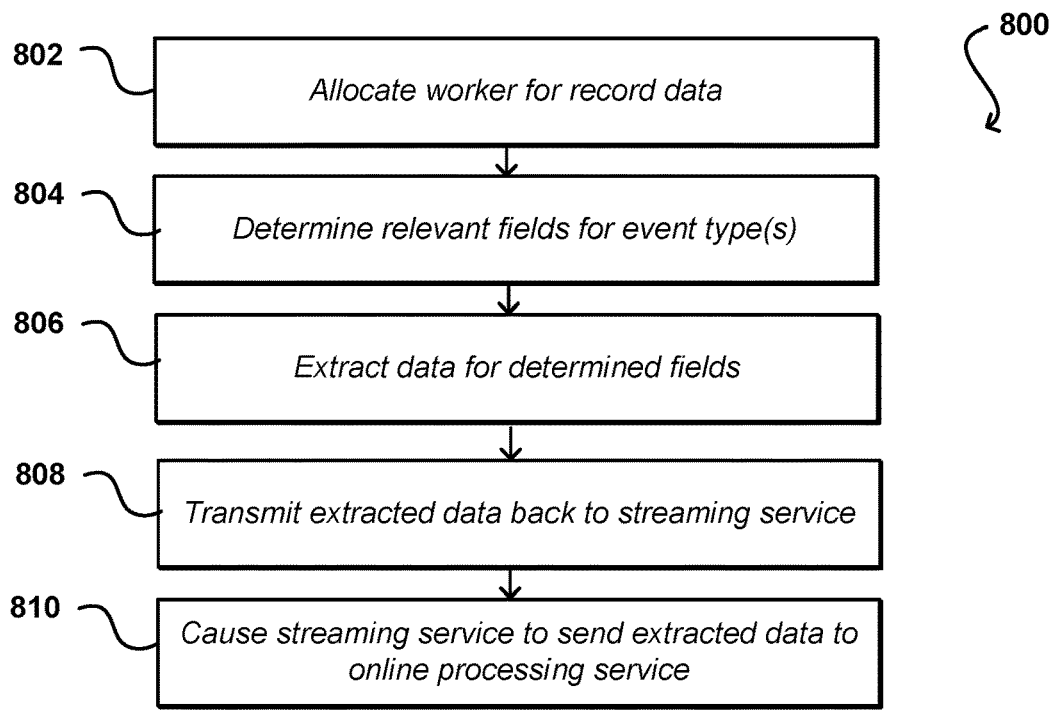
FIG. 8A and FIG. 8B illustrate online and offline processing flows, respectively, that can be utilized in accordance with various embodiments.
Figure 8B:
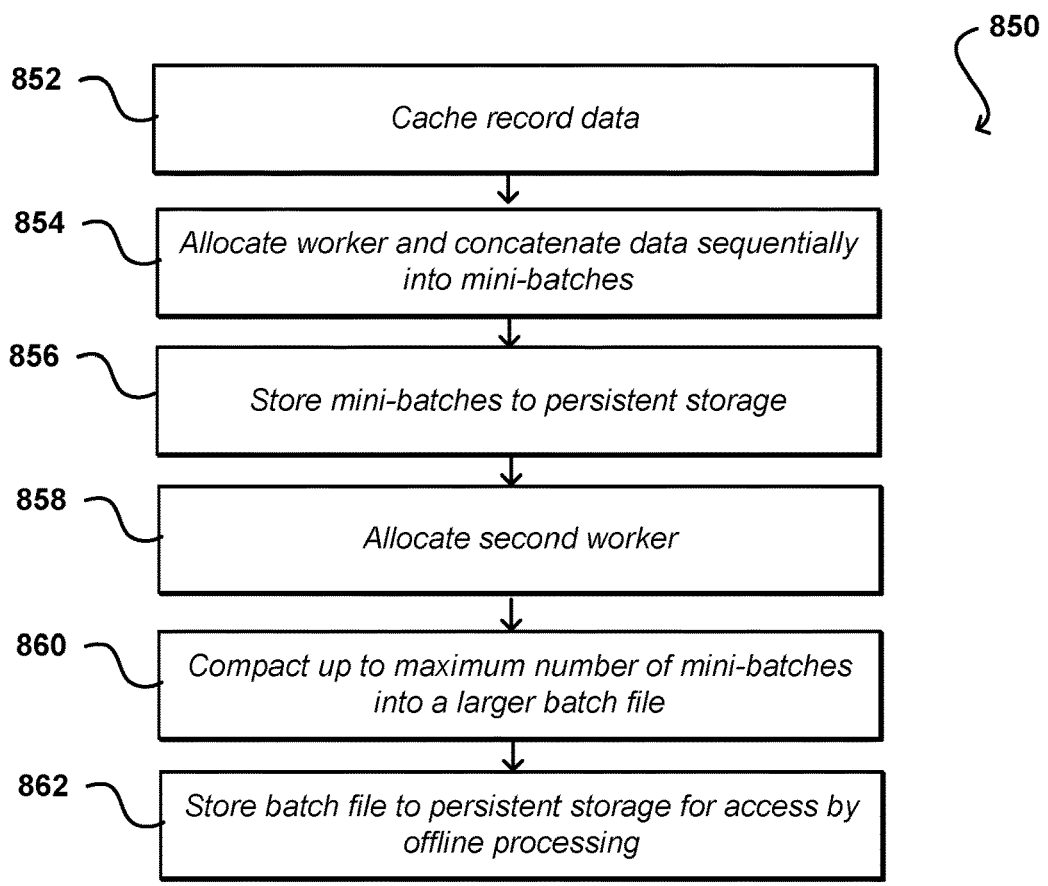

FIGS. 8A and 8B provide more detailed views of the online and offline portions, respectively, of a process such as that described with respect to FIG. 7. In the online processing portion 800 of FIG. 8A, a worker function is allocated 802 in the processing service to process the received (disaggregated and decompressed) record data. The allocated worker can determine 806 the relevant field(s) for the determined event type(s), and can extract 808 that data from the identified fields. In some embodiments, data fields for multiple event types can be extracted into a single data set that can then be passed on to the appropriate processes. Once extracted, the data can be transmitted 810 back to the streaming service. As discussed, due to extracting data from only certain fields the volume of data processed by the streaming service will be less than for the data received from the aggregator service. The streaming service can then be caused 812 to send the extracted data to an online processing service for processing.

In the offline portion 850 of FIG. 8B, the received record data (once disaggregated and decompressed) is cached or held in memory for a period of time. A worker is allocated 854 to concatenate the data sequentially into mini-batches of up to a first size. The mini-batches can be stored 856 for a second period of time, such as up to an hour as discussed elsewhere herein. The mini-batches in at least some embodiments can be stored to persistent storage. At an appropriate time, such as once an hour, a second worker is allocated 858 by the processing service that will divide the mini-batches up into groups that are then compacted 860 into larger batch files of up to a second size, which is larger than the first size. The larger batch files can then be stored 862 to persistent storage for access by one or more offline processing algorithms, etc. As mentioned, these can include algorithms for analytics, predictions, model training, and the like.

Figure 9:
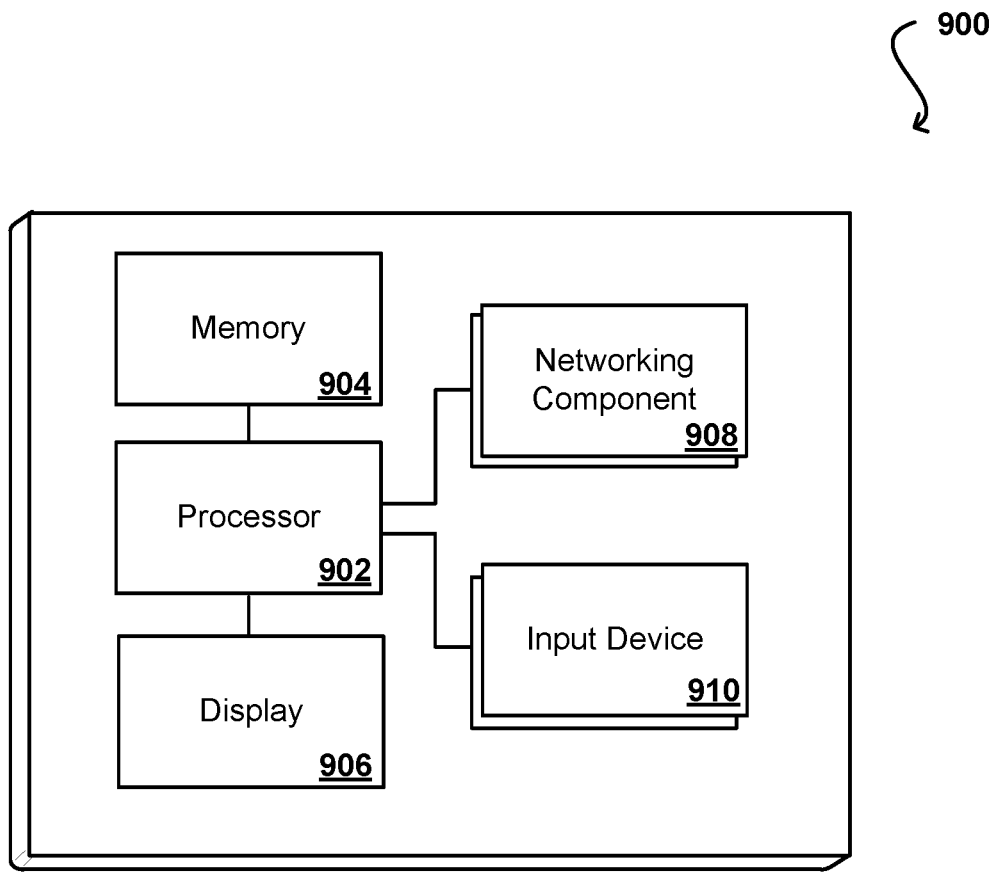
FIG. 9 illustrates example components of a computing device that can be used to implement aspects of the various embodiments.

FIG. 9 illustrates a set of basic components of an example computing device 1000 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from one or more data sources, event data for each of a plurality of events;
determining a maximum file size of the event data that is to be aggregated and compressed into each data block in a set of data blocks, wherein the maximum file size is determined as fixed or variable based at least in part on current workload or resource capacity;
aggregating, using at least two concurrently executing threads, the event data into the set of data blocks of up to a maximum file size;
compressing the data blocks using a block-based compression algorithm;
causing the data blocks to be transmitted asynchronously to a processing service, the data blocks being transmitted by a streaming service configured to provide multiple concurrent data streams for transmission of the data files;

allocating, by the processing service, one or more worker resources for performing tasks relating to the data blocks;

decompressing the data blocks to obtain individual data records for the plurality of events;

determining an event type for a specified record of individual data records, the event type being one of a bid, impression, or click;

determining at least one of online processing or offline processing to be performed for the specified record based at least in part upon the event type;

extracting, when the online processing is to be performed for the specified record, a specified set of data from the specified record and providing the specified set of data for the online processing; and providing, when the offline processing is to be performed for the specified record, a set of batched files of sequentially concatenated records from the individual data records to be stored for subsequent offline processing.

2. The computer-implemented method of claim 1, further comprising: deaggregating the data blocks at the processing service to, in part, obtain the individual data records; and transforming the individual data records to have a specified record format.

3. The computer-implemented method of claim 1, further comprising:

generating the set of batched files by concatenating the individual data records sequentially into mini-batches then subsequently compacting the mini-batches into the set of batched files.

4. The computer-implemented method of claim 1, wherein the event data corresponds to events for a real-time bidding system, and wherein providing the set of data for the online processing further comprises sending the data to the real-time bidding system.

5. The computer-implemented method of claim 1, wherein at least one of the online processing or the offline processing includes at least one of performing data analytics or predicting values for future event data.

6. A computer-implemented method, comprising:

obtaining event data corresponding to occurrences of one or more types of events;

determining a maximum number of records of the event data that are to be aggregated and compressed into each data block in a set of data blocks, wherein the maximum number is determined as fixed or variable based at least in part on current workload or resource capacity;

generating, using at least two concurrently executing threads, the set of data blocks by aggregating and compressing the event data;

causing the data blocks to be transmitted asynchronously to a processing service;

determining, by the processing service, an event type for a specified record of a set of individual data records obtained upon decompressing the data blocks, the event type being one of a bid, impression, or click;

determining at least one of online processing or offline processing to be performed for the specified record based at least in part upon the event type;

extracting, when the online processing is to be performed for the specified record, specified data from the specified record and providing the specified set of data for the online processing; and storing, when the offline processing is to be performed for the specified record, a set of batched files of sequentially concatenated records from the individual data records for subsequent offline processing.

7. The computer-implemented method of claim 6, further comprising:

generating the set of data blocks using an aggregation server obtaining the event data;

causing the aggregation server to perform the aggregating and compressing of the event data into the set of data blocks; and writing the set of data blocks to at least one event queue for retrieval and subsequent asynchronous transmission.

8. The computer-implemented method of claim 6, further comprising:

compressing the event data using a block-based compression algorithm.

9. The computer-implemented method of claim 6, further comprising:

asynchronously transmitting the data blocks to the processing service using a streaming service configured to provide multiple current data streams for transmission of the data blocks.

10. The computer-implemented method of claim 6, further comprising: disaggregating the data blocks to, in part, obtain the set of individual data records.

11. The computer-implemented method of claim 6, further comprising:

determining a set of record fields including data to be extracted based at least in part upon the event type; and extracting the specified data from the set of record fields.

12. The computer-implemented method of claim 6, further comprising: generating the set of batched files by concatenating the individual data records sequentially into mini-batches and subsequently compacting the mini-batches into the set of batched files.

13. The computer-implemented method of claim 12, further comprising: causing the mini-batches to be compacted into the set of batched files at regular intervals, the mini-batches respectively having at most a first size smaller than a second maximum size of a batched file of the set.

14. The computer-implemented method of claim 6, further comprising: monitoring a set of metrics for processing of the event data, the set of metrics including at least one of a number of put requests, a number of get requests, a latency value, a provisioning throughput value, a queue size for one or more data queues, a number of processing machines, a workload, or an iterator age metric.

15. The computer-implemented method of claim 6, further comprising: causing the processing service to allocate a plurality of worker resources for processing the data blocks.

16. A system, comprising:

at least one processor; and memory including instructions that, when executed by the at least one processor, cause the system to:

obtain event data corresponding to occurrences of one or more types of events;

determine a maximum file size of the event data that is to be aggregated and compressed into each data block in a set of data blocks, wherein the maximum file size is determined as fixed or variable based at least in part on current workload or resource capacity;

generate, using at least two concurrently executing threads, the set of data blocks by aggregating and compressing the event data;

cause the data blocks to be transmitted asynchronously to a processing service;

determine, by the processing service, an event type for a specified record of a set of individual data records obtained upon decompressing the data blocks, the event type being one of a bid, impression, or click;

determine at least one of online processing or offline processing to be performed for the specified record based at least in part upon the event type;

extract, when the online processing is to be performed for the specified record, specified data from the specified record and providing the specified set of data for the online processing; and store, when the offline processing is to be performed for the specified record, a set of batched files of sequentially concatenated records from the individual data records for subsequent offline processing.

17. The system of claim 16, wherein the instructions when executed further cause the system to:

asynchronously transmit the data blocks to the processing service using a streaming service configured to provide multiple current data streams for transmission of the data blocks;

disaggregate the data blocks to, in part, obtain the set of individual data records;

transform the individual data records to have a specified record format.

18. The system of claim 16, wherein the instructions when executed further cause the system to:

determine a set of record fields including data to be extracted based at least in part upon the event type; and extract the specified data from the set of record fields.

19. The system of claim 16, wherein the instructions when executed further cause the system to:

use a determined naming pattern for the individual data records, the determining naming pattern based on information determinable from the individual data records; and eliminate redundant individual data records based at least in part upon detecting redundant record names following the determined naming pattern.

* * * * *